United States Patent [19]
Sullivan

[11] Patent Number: 5,360,300
[45] Date of Patent: Nov. 1, 1994

[54] CUTTER SHELL

[75] Inventor: James B. Sullivan, Tulsa, Okla.

[73] Assignee: TDW Delaware, Inc., Wilmington, Del.

[21] Appl. No.: 166,503

[22] Filed: Dec. 13, 1993

[51] Int. Cl.$^5$ ............................................. B23B 51/04
[52] U.S. Cl. .................................... 408/204; 408/703
[58] Field of Search ................ 408/204, 206, 207, 703

[56] References Cited

U.S. PATENT DOCUMENTS

| | | |
|---|---|---|
| 72,436 | 12/1867 | Wippo . |
| D. 262,630 | 1/1982 | Logan, Jr. .................... D15/139 |
| 1,441,994 | 1/1923 | Mueller . |
| 1,827,511 | 10/1931 | Evans . |
| 1,855,873 | 4/1932 | Shortell . |
| 4,258,742 | 3/1981 | Louthan et al. .................... 137/318 |

FOREIGN PATENT DOCUMENTS 3705717 9/1988 Germany .............................. 408/204

Primary Examiner—Daniel W. Howell
Attorney, Agent, or Firm—Head and Johnson

[57] ABSTRACT

A cutter shell for cutting a circular opening in a metal object formed of a unitary metallic member having a tubular boring portion and an inverted dish shaped head portion. The boring portion has a tubular sidewall and teeth at the forward circumferential end. The sidewall is of thickness not greater than the teeth. The head portion has an outer circumferential perimeter secured to the tubular portion rearward circumferential end. The head portion has an inner concave surface as viewed through the tubular boring portion and an outer convex surface. The thickness of the head portion is not substantially greater than that of the boring portion tubular sidewall so that the head portion deflects inwardly in response to boring pressure, the deflection being radially transferred to the boring portion tubular sidewall to stiffen the sidewall and hold it in more perfect circularity during boring action.

1 Claim, 2 Drawing Sheets

CUTTER SHELL

BACKGROUND OF THE INVENTION

This invention relates to an improved cylindrical cutter head for cutting holes in metal objects and particularly irregular metal objects. An example of the application of the cutter head is for cutting a hole in a pipe wall. It can be easily understood that when cutting a relatively large diameter hole in the wall of a relatively large diameter pipe that the tubular cutter head undergoes substantial stress during the cutting action. The reason is that when cutting initially starts the tubular cutter head engages the pipe only on portions that are 180° apart. As the cutting depth increases the amount of contact of the cutter head with the pipe wall slightly increases but at no time does the full 360° of the cutting head contact the pipe. Since the sidewall of a tubular cutter head is preferably relatively thin the forces encountered during cutting operations can cause the sidewall to deflect, thus, either forming an irregular shaped hole or causing more rapid wear on the teeth of the cutter head.

A cutter head having a tubular sidewall should ideally remain symmetrically circular throughout the cutting operation so that cutting action does not vary with respect to the axis of rotation of the boring bar or other member by which the cutter head is rotated.

It is normally desirable that the tubular sidewall of a cutter head be relatively thin. This is so since the tubular sidewall must be no greater in thickness than the width of the cutting teeth. Obviously, the wider the cutting teeth the more force that is required to form a hole in a pipe or other object. Ideally, the width of the teeth of a tubular boring portion of a cutter head is as narrow as possible to reduce the cutting energy required. Obviously, the tubular sidewall of the cutting head must be of thickness no greater than the teeth since the sidewall must follow the teeth through the hole as it is cut. This means that ideally a cutter head tubular sidewall needs to be as thin as possible but, at the same time, it must have sufficient rigidity to withstand the tremendous forces that are encountered in cutting through an irregular object while preserving its concentricity about its rotational axis.

Others have provided cutting heads for cutting large diameter holes in metal objects such as illustrated in U.S. Pat. Nos. 1,441,994 issued to Mueller entitled "Shell Cutter And Drill For Drilling Machines" and 1,855,873 issued to Shortell entitled "Cutting Tool". Each of these patents show a cutter head having a cutting member with a relatively thin tubular wall and a head portion that attaches to the tubular cutting member. In each case the rotatable head is of a relatively thick material that is substantially greater in thickness than that of the annular cutting member. Neither of these patents show devices where the head portion is configured to deflect or otherwise change the force applied to the annular cutting member tubular sidewall in the process of cutting a large diameter hole.

An object of the present invention is to provide an improved cutter shell having a boring portion with a tubular sidewall with teeth at the forward circumferential end and an inverted dish shaped head portion of relatively thin material. The head portion deflects in response to boring pressure. The deflection serves to apply force to the circumferential upper end of the tubular boring portion to stiffen and make it more resistant to deflection to thereby reduce the possibility of the boring portion tubular sidewall taking a non-circular shape during a boring operation.

SUMMARY OF THE INVENTION

The improved cutter shell of this invention is for cutting a circular opening in a metal object, particularly, an irregular metal object such as the sidewall of a pipe. The cutter shell is for use on a boring machine having a boring bar that rotates about a rotational axis. The typical boring bar can be axially advanced as it is rotated and has means on the end thereof to receive the attachment of the cutter shell. In this way, the cutter shell is held for rotation about the boring bar rotational axis and the cutting shell is axially advanced by the boring bar as a hole is formed in a metal object.

The cutter shell of this invention is a unitary item having two basic portions. The first portion is a tubular boring portion that has a tubular axis, a tubular sidewall, a circumferential forward end and a circumferential rearward end. The circumferential forward end has cutting teeth formed thereon, the teeth being of selected width as width is measured in planes including the tubular sidewall tubular axis. The tubular sidewall is of generally uniform thickness and the thickness is not greater than or is preferably slightly less than the width of the teeth.

The second basic portion of the unitary cutter shell is an inverted dish shaped head portion. This is the portion that is affixed to the end of a boring bar. The dish shaped portion has an outer circumferential perimeter that is secured to the boring portion rearward circumferential end. The head portion also has an inner concave surface and an outer convex surface. The head portion is of generally uniform thickness, not substantially greater than the thickness of the boring portion tubular sidewall.

The head portion is deflectable in response to force applied by a boring bar. This deflection is transferred radially to the boring portion tubular sidewall to stiffen and strengthen the sidewall against deflection as boring takes place. The deflectable head portion helps ensure that the boring portion tubular sidewall will retain its circularity during boring operation.

DESCRIPTION OF THE VIEWS OF THE DRAWING

FIG. 5 is taken from U.S. Pat. No. 1,855,873 entitled "Cutting Tool".

DESCRIPTION OF THE PREFERRED EMBODIMENT

Figure 5:
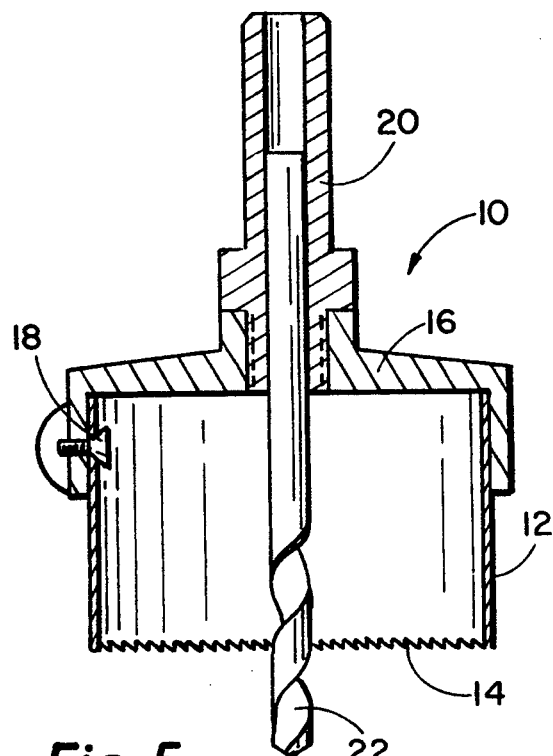
FIG. 5 is a cross-sectional view of a cutting tool representative of the prior art to which the present invention is an improvement.

Referring to the drawings, and first to FIGS. 5 and 6 which illustrate prior art, the basic concepts of tools for cutting relatively large diameter holes will be described. FIG. 5 illustrates a hole cutting tool generally indicated by the numeral 10 and includes a tubular boring portion 12 that has a tubular sidewall with a forward end having teeth 14 thereon. The tubular boring portion 12 is supported by a head portion 16 that is formed of relatively thick metal. The head portion 16 has a screw 18 for attachment of boring portion 12. As head portion 16 rotates tubular boring portion 12 will simultaneously rotate to cause teeth 14 to cut a hole in an object. A shaft 20 is secured to the head portion 16 as a means of attaching the head portion to a rotation device (not shown). To help center the tool a bit 22 is secured by the shaft.

The device of FIG. 5 works very successfully if the hole to be cut is in a flat plate so that all the teeth 14 simultaneously engage the member to be cut, or if cutting is relatively easy or if the hole to be cut is of relatively small diameter. A problem arises, however, when using the device of FIG. 5 to cut a large diameter hole in an irregular metal object, such as the sidewall of a pipe. In this case, there is a tendency for the sidewall of the tubular boring portion 12 to deflect inwardly and/or outwardly to thereby cause the formation of an irregularly shaped hole or to cause excessive wear on teeth 14.

Figure 6:
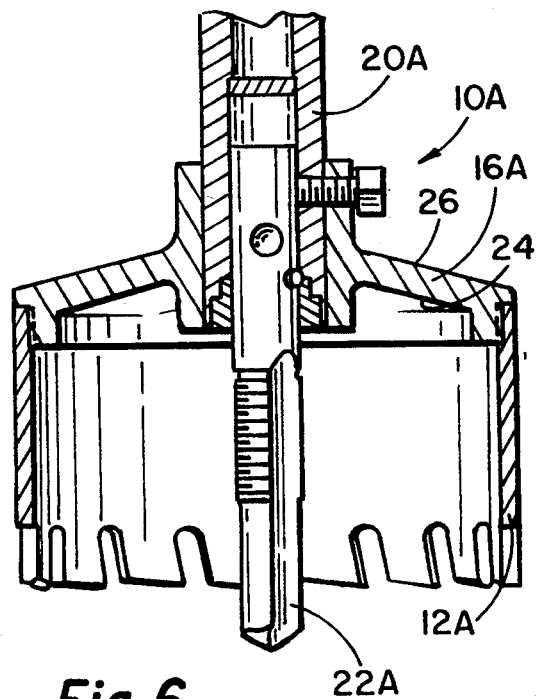
FIG. 6 is a cross-sectional view further representing the prior art as illustrated in U.S. Pat. No. 1,441,994 entitled "Shell Cutter And Drill For Drilling Machines".

FIG. 6 shows an alternate arrangement wherein the similar elements are designated by the same numbers with an "A" added. In FIG. 6 the tubular boring portion 12A is secured to the head portion 16A by a threadable attachment. In addition, the head portion 16A has a concave inner surface 24 and a convex outer surface 26. The head portion 16A is relatively thick as compared to the thickness of the cylindrical boring portion 12A so that the head portion 16A remains rigid during drilling operations. As with the embodiment of FIG. 5, the tubular sidewall of the boring portion 12 can deflect during boring operations under tough conditions.

Figure 1:
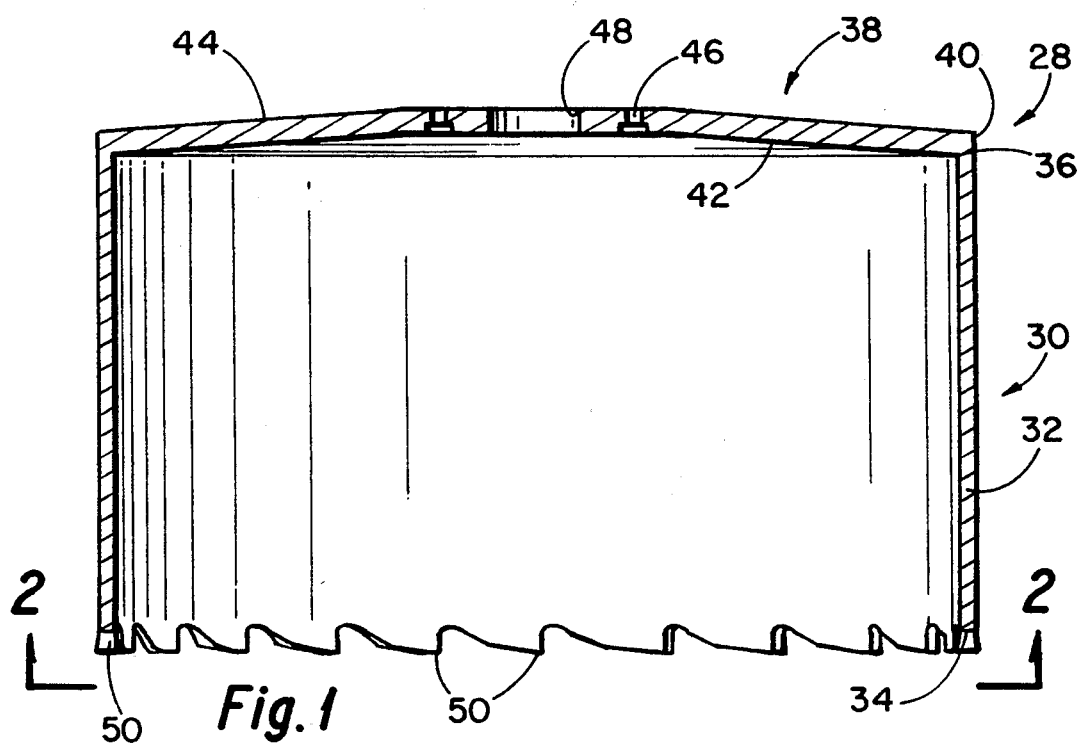
FIG. 1 is an elevational cross-sectional view of a cutter shell embodying the principles of this invention.
Figure 2:
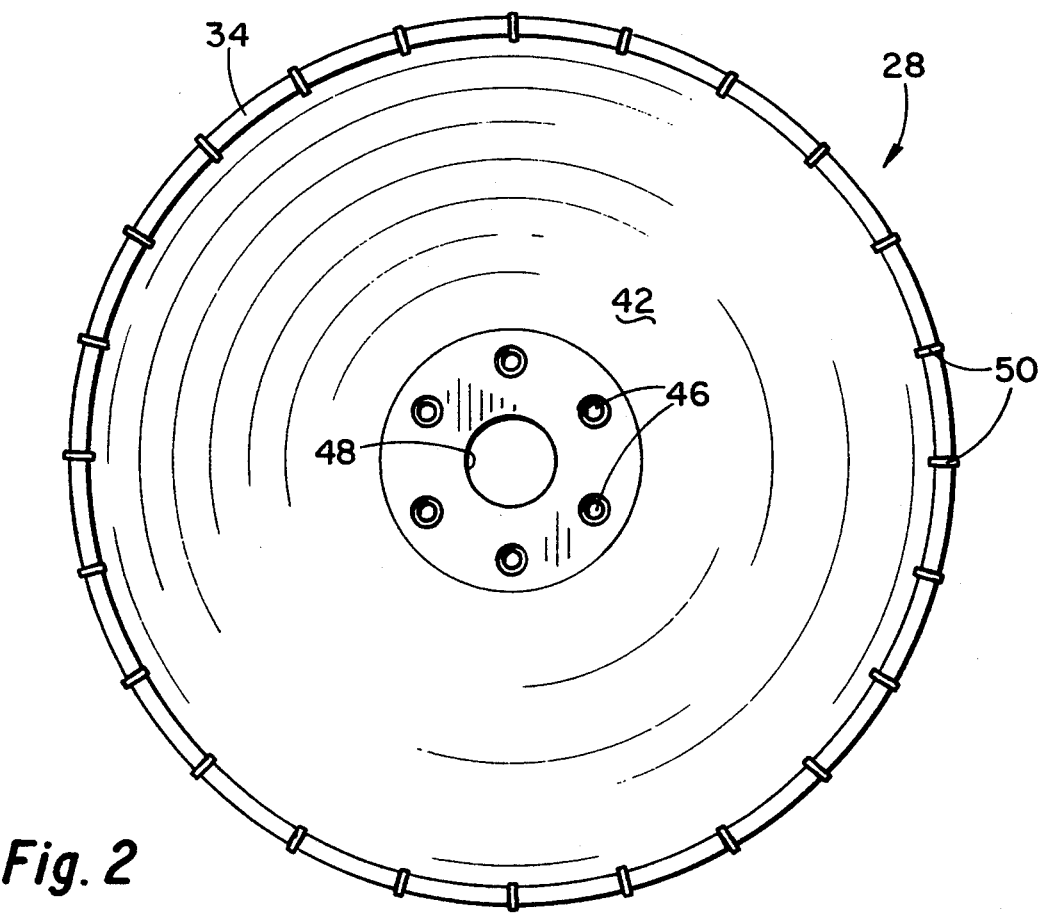
FIG. 2 is an end view taken along the line to 2 of the improved cutter shell.

Referring now to FIGS. 1 and 2, the present invention is illustrated. These figures show a cutting shell generally indicated by numeral 28 having two basic portions. The first basic portion is a tubular boring portion, generally indicated by the numeral 30, having a tubular sidewall 32. The tubular sidewall has a forward circumferential end 34 and a rearward circumferential end 36.

The second basic portion of the cutter shell 28 is an inverted dish shaped head portion, generally indicated by the numeral 38. This head portion has an outer circular perimeter 40 that is secured to tubular sidewall rearward circumferential end 36, such as by welding. Tubular sidewall 32 and head portion 38 can be integrally formed (as illustrated) but normally it is preferred that the items be separately formed and made unitary by welding them together.

Dish shaped head portion 38 has a concave inner surface 42 and a convex outer surface 44. Head portion 38 is provided with means, such as openings 46, by which it may be supported to the end of a boring bar. Further, head portion 38 has a larger diameter opening 48 which may be used to accept a center drill bit as illustrated in FIGS. 5 and 6.

Figure 4:
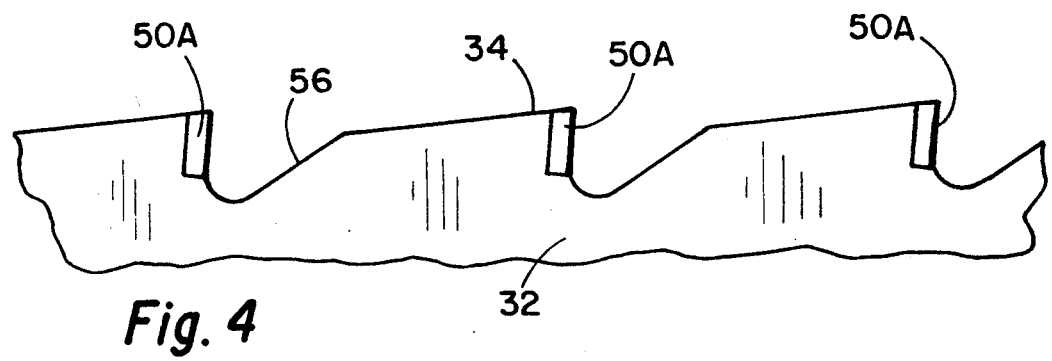
FIG. 4 is an elevational segmented view of the cutting teeth of the tubular boring portion.

The forward circumferential end 34 of tubular sidewall 32 is provided with spaced apart teeth 50. The teeth are formed by providing recesses 56 (see FIG. 4) in the forward circumferential end 34 of tubular sidewall 32. Teeth 50 can be integral or, as shown in FIG. 4, may be formed by inserts 50A that are welded in the recesses 56 in sidewall 32. These inserts are typically made of tool steel or some other extremely hard metal to add longer drilling life to the cutter head.

Figure 3:
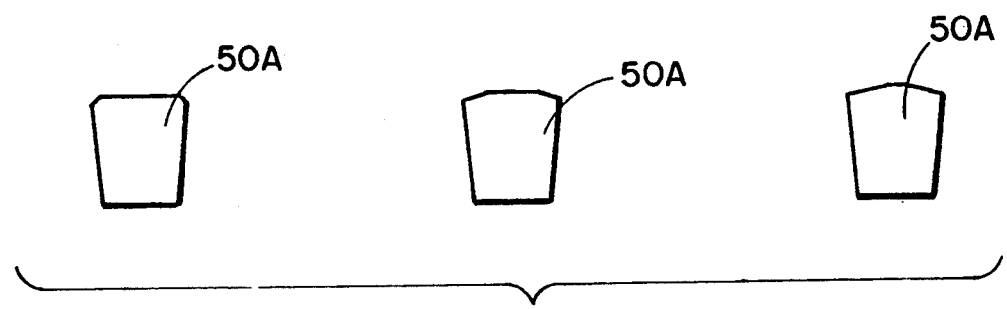
FIG. 3 is an illustration of the configuration of the teeth that are affixed to the circumferential forward end of the boring portion tubular sidewall showing how the teeth can vary in shape to thereby augment cutting action as the cutter shell is rotated.

As shown in FIG. 3, teeth 50A may be of various contours to speed cutting action.

The hole cutting tool as illustrated in FIGS. 1 and 2 and described herein provides an improved apparatus for cutting large diameter holes in irregular metal objects such as, particularly, the sidewall of a pipe, by providing an apparatus having the unique characteristics of an inverted dish shaped head portion that deflects as boring pressure is applied to apply radial forces to the tubular sidewall of the tubular boring portion. This deflection adds stiffness to the tubular boring portion to ensure a more uniform cutting pattern.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. An improved cutter shell for cutting a circular opening in a metal object by use of a boring machine having a boring bar that rotates about its rotational axis, the boring bar being axially advanceable and the boring bar having means at an operating end to receive the attachment of the cutter shell so that the cutter shell is rotatable about the boring bar rotational axis and is axially advanced as the boring bar is axially advanced, the improved cutter shell comprising:

a unitary metallic member having:

(a) a tubular boring portion having a tubular axis, a tubular sidewall, a circumferential forward end and a circumferential rearward end, the forward end having cutting teeth formed thereon, the teeth being of selected width measured in planes having said cylindrical axis therein, the tubular sidewall being of generally uniform thickness not greater than the width of said teeth; and (b) an inverted dish shaped head portion having an outer circular perimeter, an inner concave surface and an outer convex surface, the outer circular perimeter being secured to said boring portion rearward circumferential end, the head portion being of generally uniform thickness not substantially greater than said thickness of said boring portion tubular sidewall, the head portion external surface having means in the center thereof for attachment to a boring bar, the head portion being deflectable in response to force applied by a boring bar as the head portion is rotated to thereby rotate said cylindrical boring portion, the deflection of said head portion being transferred to said boring portion tubular sidewall to stiffen the tubular sidewall during boring action.

* * * * *